(12) United States Patent
Thomas

(10) Patent No.: US 7,644,213 B2
(45) Date of Patent: Jan. 5, 2010

(54) RESOURCE ACCESS MANAGER FOR CONTROLLING ACCESS TO A LIMITED-ACCESS RESOURCE

(75) Inventor: Charles D. Thomas, Ashland, OR (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 194 days.

(21) Appl. No.: 11/810,510

(22) Filed: Jun. 5, 2007

(65) Prior Publication Data

US 2008/0307139 A1 Dec. 11, 2008

(51) Int. Cl.
*G06F 12/00* (2006.01)

(52) U.S. Cl. ..................... 710/244; 711/151
(58) Field of Classification Search .............. 710/240, 710/244; 711/151, 158
See application file for complete search history.

(56) References Cited

U.S. PATENT DOCUMENTS

2002/0065701 A1 * 5/2002 Kim et al. ............... 705/9
2002/0120819 A1 * 8/2002 Hickson ................. 711/152

* cited by examiner

*Primary Examiner*—Clifford H Knoll
(74) *Attorney, Agent, or Firm*—Holland & Hart, LLP

(57) ABSTRACT

Methods and devices utilizing operating system semaphores are described for managing access to limited-access resources by clients.

12 Claims, 6 Drawing Sheets

RESOURCE ACCESS MANAGER FOR CONTROLLING ACCESS TO A LIMITED-ACCESS RESOURCE

BACKGROUND OF THE INVENTION

The present invention relates to resource access management, and more particularly to a method and system for managing access to a limited-access resource by multiple clients.

A computerized system may include a resource that allows exclusive access by one client at a time. Access to the resource is typically controlled by a resource access management technique. One resource access management technique is to require clients to poll the resource for availability. Polling requires processing resources of the client, which decreases client processing capability for performing other tasks.

Another resource access management technique involves the implementation of a message queue. A message queue queues up structured messages (requests for access). The managed resource retrieves messages from the message queue and processes the retrieved message one at a time. Messages are typically, but not necessarily, processed by the resource on a first-in-first-out (FIFO) basis.

Message queues allow ordered determination of which client receives access to a resource at a given time. It also frees up the client to perform other tasks without polling the resource. A structured message typically includes a message type field, a message length field, and a variable-length message data field. When a request is added to a message queue, the fields of the message structure are filled in and then the structure is submitted to a queuing function which adds the structure to the queue. The message data field typically includes details of the request, which may include a significant amount of data. Data transfer operations are expensive in terms of system resources and execution time. Furthermore, because queue management functions (such as adding messages to or removing messages from a queue) are implemented at the application level, they are subject to interruption by other system-level or higher priority application tasks, which further serves to increase queue management overhead.

It is always desirable in computer processing systems to reduce the overhead in terms of time and resources of the underlying processor. It would therefore be desirable to have a technique for managing access to a resource that allows exclusive or limited access at a given time and that keeps track of the order of the requests. It would also be desirable that the technique be very fast and utilize few system resources.

SUMMARY OF THE INVENTION

Embodiments of the invention utilize an hierarchical queue of semaphores to control access to limited-access resources.

In one embodiment, a method for controlling access to a limited-access resource comprises the steps of: creating a plurality of semaphores associated with the resource, each semaphore corresponding to a different access request priority level, the plurality of semaphores comprising a high priority semaphore that controls access to the resource, and at least one lower priority semaphore that gates low priority access requests into the high priority semaphore; receiving an access request for access to the resource from a client process; determining a priority level associated with the access request; if the semaphore corresponding to the priority level associated with the access request is available, allowing the access request to obtain the semaphore corresponding to the priority level associated with the access request; if the semaphore corresponding to the priority level associated with the access request is not available, suspending the access request; monitoring availability of each of the plurality of semaphores; and when any of the plurality of semaphores becomes available, allowing a suspended access request waiting for the available semaphore to obtain the available semaphore.

In one embodiment, a computer readable storage medium tangibly embodies program instructions which, when executed by a computer, implement a method for controlling access to a limited-access resource. The method comprises the steps of: creating a plurality of semaphores associated with the resource, each semaphore corresponding to a different access request priority level, the plurality of semaphores comprising a high priority semaphore that controls access to the resource, and at least one lower priority semaphore that gates low priority access requests into the high priority semaphore; receiving an access request for access to the resource from a client process; determining a priority level associated with the access request; if the semaphore corresponding to the priority level associated with the access request is available, allowing the access request to obtain the semaphore corresponding to the priority level associated with the access request; if the semaphore corresponding to the priority level associated with the access request is not available, suspending the access request; monitoring availability of each of the plurality of semaphores; and when any of the plurality of semaphores becomes available, allowing a suspended access request waiting for the available semaphore to obtain the available semaphore.

In one embodiment, a system comprises a limited-access resource and a resource access management function. The resource access management function creates a plurality of semaphores associated with the resource. Each semaphore corresponds to a different access request priority level. The plurality of semaphores comprise a high priority semaphore that controls access to the resource, and at least one lower priority semaphore that gates low priority access requests into the high priority semaphore. The resource access management function receives an access request for access to the resource, determines a priority level associated with the access request, and if the semaphore corresponding to the priority level associated with the access request is available, allows the access request to obtain the semaphore corresponding to the priority level associated with the request. If the semaphore corresponding to the priority level associated with the access request is not available, the resource access management function suspends the access request. The resource access management function monitors availability of each of the plurality of semaphores and when any of the plurality of semaphores becomes available, allows a suspended access request waiting for the available semaphore to obtain the available semaphore.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural logical and electrical changes may be made without departing from the spirit and scope of the present invention. The following detailed description is, therefore, not to be taken in a limiting sense, and the scope of the present invention is defined only by the appended claims.

Embodiments of the invention presented herein describe methods and devices that use operating system semaphores to control and manage the number of clients accessing a resource at any given time.

Figure 1:
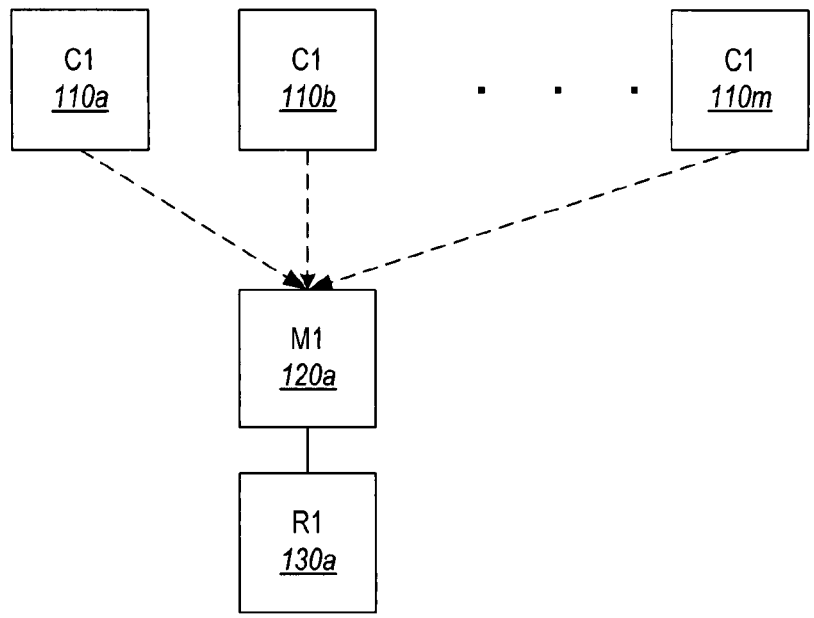
FIG. 1 is a block diagram illustrating an embodiment of a system utilizing a resource access management function for controlling access to a limited-access resource.

FIG. 1 is a block diagram illustrating an embodiment of a system comprising multiple clients 110a, 110b, 110m bidding for access to a resource 120. The resource 120 may be configured to be accessed by only a limited number, MAX, of clients at any given time. For example, in the simplest case, the resource 120 is configured to be accessed by only a single client (MAX=1) at any given time. In other embodiments, the resource 120 may be configured to restrict access to a greater, but limited, number (MAX>1) of clients at any given time. A resource access management function 130 controls access to the resource 120 to limit the number of clients accessing the resource 120 at any one time to the predetermined limit (MAX).

Figure 2:
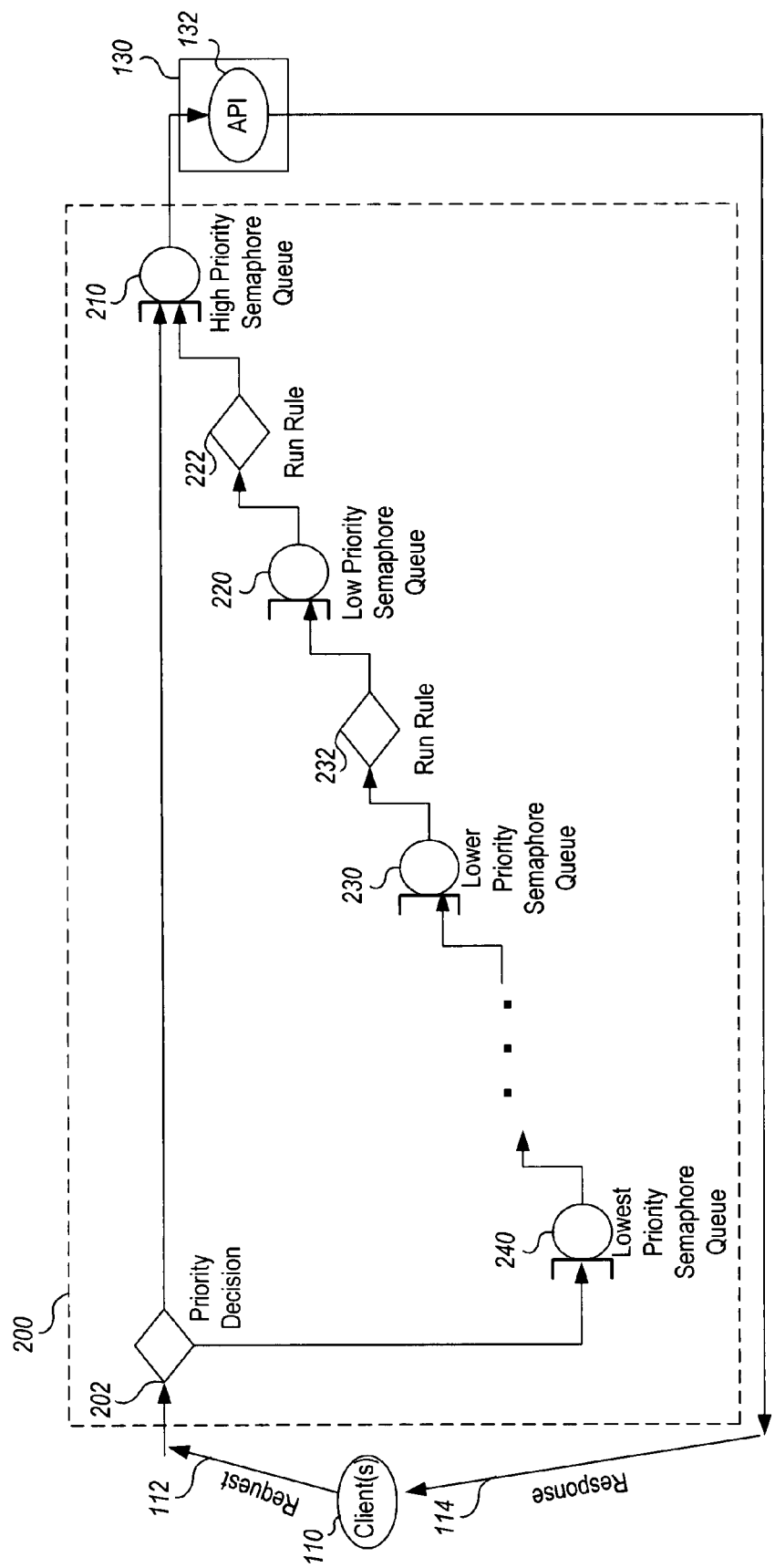
FIG. 2 is a functional block diagram of an exemplary embodiment of a resource access management function.

FIG. 2 shows a functional block diagram of an exemplary resource access management function 200. In general, the resource access management function 200 includes a hierarchical plurality of queues 210, 220, 230, 240, each having a corresponding priority level. The resource access management function 200 receives resource access requests 112 from clients 110. A priority decision function 202 processes each received request and places it in the queue corresponding to its priority level. Each queue 210, 220, 230, 240 is configured to include access requests having a priority level corresponding to the queue's priority level. Thus, high priority access requests are queued in the high priority queue 210, low priority access requests are queued in the low priority queue 220, lower priority access requests are queued in the lower priority queue 230, and so on such that the lowest priority access requests are queued in the lowest priority queue 240.

Access requests are processed by the resource 130 from the high priority queue 210 on a first-in-first-out (FIFO) basis. The resource 130 provides an access function 132 (for example an application programming interface (API)) for submitting a request from the high priority queue 210 to the resource 130. The access function 132 may also include a method or function for returning a response 114 from the resource 130 to the requesting client 110.

Access requests queued in a lower level queue may flow from the lower level queue into a higher level queue when certain predetermined conditions, or run rules 222, 232, are met. The run rules 222, 232 define when a request may be bumped up to a higher level queue (i.e., removed from a lower level queue and added to a higher level queue). The run rules 222, 232 may be different for each queue. For example, the run rules 222 associated with the low priority queue 220 may mandate that a low priority access request is removed from the low priority queue 220 and queued in the high priority queue 210 if there are not more than a predetermined maximum number of low priority access requests in the high priority queue 210. As further example, the run rules 232 associated with the lower priority queue 230 may mandate that any number of lower priority access requests may be bumped up into the low priority queue 220 as long as the number of access requests in the low priority queue 220 is below a certain predetermined number. The run rules may be customized to the particular application in which the resource access management function operates.

In one embodiment, as shown in FIG. 2, access requests queued in a lower level queue flow from the lower level queue only into the next higher level queue, recursively. Thus, each access request must flow through its corresponding priority level queue and each higher level queue before gaining access to the resource 130.

The resource access management function 200 is implemented in software (i.e., as program instructions) that is executed by a computer processor. Access requests may be processes or threads that are executed by the same computer processor which executes the resource access management function software, or may be a different computer processor (which may be remote such as a client requesting access to a server in a computer network). The queues 210, 220, 230, 240 are each implemented using an operating system semaphore.

In general, computer operating systems provide a mechanism called a "semaphore" which operates as a binary flag and is used to lock a resource or indicate the status of a common resource. Embodiments of the invention utilize semaphores to implement an hierarchy of queues. Traditionally, semaphores have been used as a binary (or sometimes n-ary flag) which indicate whether a resource associated with the semaphore is locked (and hence unavailable) or unlocked (and hence available). The function of the semaphore in embodiments of the invention is multifold in that not only does the semaphore indicate the present availability of a resource, but it also naturally and automatically sets up an operating system level queue for access to the resource and/or to different priority level queues. The semaphores operate as natural gates to different levels in a queueing hierarchy waiting for a resource.

OS semaphores can be used in a multitude of ways. The embodiments illustrated herein allow the semaphore to operate like an access token. When the semaphore value is greater than zero (in Linux, semval>0), any process or thread may "grab" the token. (In Linux, the semval is decremented by calling semop(sem_op=−1)). When the semaphore value is zero or less (in Linux, semval>0), any process or thread that tries to decrement it becomes suspended. The process or thread that successfully grabbed the token continues to run until completion. When the process or thread runs to completion, it releases the token by calling semop(sem_op=+1) which increments the semaphore (making available one access slot). The OS then accesses the list of suspended tasks that are waiting to grab the token (in Linux, by successfully decrementing the semaphore) and allows the first in line to grab it and continue to run.

The use of semaphores in implementing the queues is advantageous for several reasons. First, because semaphores are controlled directly by the operating system, semaphore operations are generally not interrupted by other operating system level tasks or by higher level priority application tasks (i.e., the semaphore operations are atomic—that is, the operation instructions are performed sequentially as a unit, and only if they can all be executed without interruption). This reduces the overhead of queue management in terms of amount of time and processing power. In addition, unlike the use of message queues in which large amounts of data are stored, semaphores do not store data. Thus, no execution time is spent writing request data into, and reading data from, a queue data structure.

In embodiments of the invention, a semaphore implementing a given queue may be set to a predetermined maximum number, MAX (in Linux, by calling semop(sem_op=MAX). When the flag is greater than zero (sem_op>0), any process or thread may decrement it by calling semop(sem_op=−1). When the semaphore is zero, any process or thread that tries to decrement it becomes suspended indefinitely and is queued in order of first-come-first-served (FIFO) by the operating system. A process or thread that successfully decrements the semaphore continues to run.

When the process or thread which has been granted access to the resource has completed its task, it releases the semaphore (by calling semop(sem_op=+1) which increments the semaphore). The operating system then allows the first queued process or thread waiting in line to decrement the semaphore and to thereby continue to run. The operations to increment and decrement the semaphore are guaranteed atomic by the operating system, so that only a single process or thread can complete the operation at a time. This causes all tasks that require the semaphore and which have yet to successfully decrement it to become suspended, while only those that successfully decrement the semaphore are able to access the resource. When a process or thread is done accessing the resource, it release the semaphore by incrementing it.

The resource access management function uses one semaphore for each level of priority of access requests to control exclusive access to a limited-access resource. The total effect is to queue high priority tasks by way of the high priority semaphore and to queue lower priority tasks by way of the lower priority semaphores, but to allow the lower priority tasks access to the resource by recursively elevating them to the next higher level priority queue after they have obtained each successive lower priority semaphore.

Figure 3:
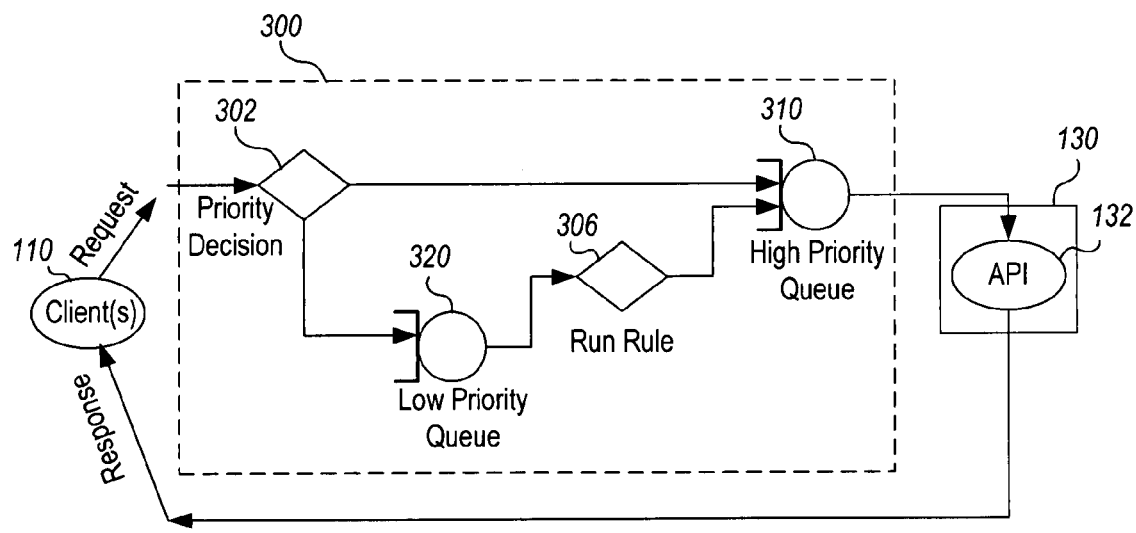
FIG. 3 is a block diagram of an exemplary embodiment of a resource access management function implementing a high priority queue and a low priority queue.

For example, in one embodiment, shown in FIG. 3, a resource access management function 300 includes a high priority queue 310 and a low priority queue 320. The resource access management function 300 utilizes two semaphores to implement a high priority queue 310 and a low priority queue 320 in controlling exclusive access to a given resource 330. To gain access to the resource 330, any process or thread must successfully decrement the high priority semaphore controlling high priority queue 310 from 1 to zero. If the access request is a high priority task, then that is all that it must do.

However, if the access request is a low priority task, then it must first decrement the low priority semaphore controlling high priority queue 320 from 1 to zero. This ensures that there can only be a single process or thread at a time that has successfully decremented the low priority semaphore, and that all other low priority processes or threads are suspended while the successful low priority process or thread attempts to decrement the high priority semaphore.

Thus, high priority tasks are queued at the semaphore implementing the high priority queue 310, and low priority tasks are queued at the semaphore implementing the low priority queue 320 but are bumped up one at a time to the high priority queue 310 upon obtaining the low priority semaphore. In this embodiment, the high priority queue 310 can only ever contain a single low priority task. All other low priority tasks are queued behind the low priority semaphore in the low priority queue 320. Additional high priority tasks are queued at the high priority semaphore as they arrive which places them in front of all the suspended low priority tasks.

It is to be understood that if a resource allows access to it by more than one client, yet limits the number of clients that can access it to a predetermined maximum number, the value of the semaphore implementing the high priority queue may be set to the predetermined maximum number. For example, suppose a resource allows up to four clients accessing it. The high priority queue semaphore may be initialized to the number 4 (by calling semop(sem_op=4)), thereby allowing access any client who successfully decrements the semaphore (by calling semop(sem_op=−1)) to zero or greater, but limiting the number to four (4) clients accessing the resource at any given time.

It will also be appreciated that in some embodiments it may be desired to allow more than one lower level access request to be in the next level queue at a time. For example, in one embodiment, the run rules for a given queue level may allow an access request to bump up to the next level queue if bumping up the access request would place at most two lower level priority access requests in the higher level queue. In this embodiment, the lower priority queue semaphore may be initialized to the number 2 (by calling semop(sem_op=2)), thereby allowing any lower level access request in the lower priority queue which successfully decrements the semaphore (by calling semop(sem_op=−1)) to zero or greater, but limiting the number to two (2) clients accessing the resource at any given time.

Figure 4:
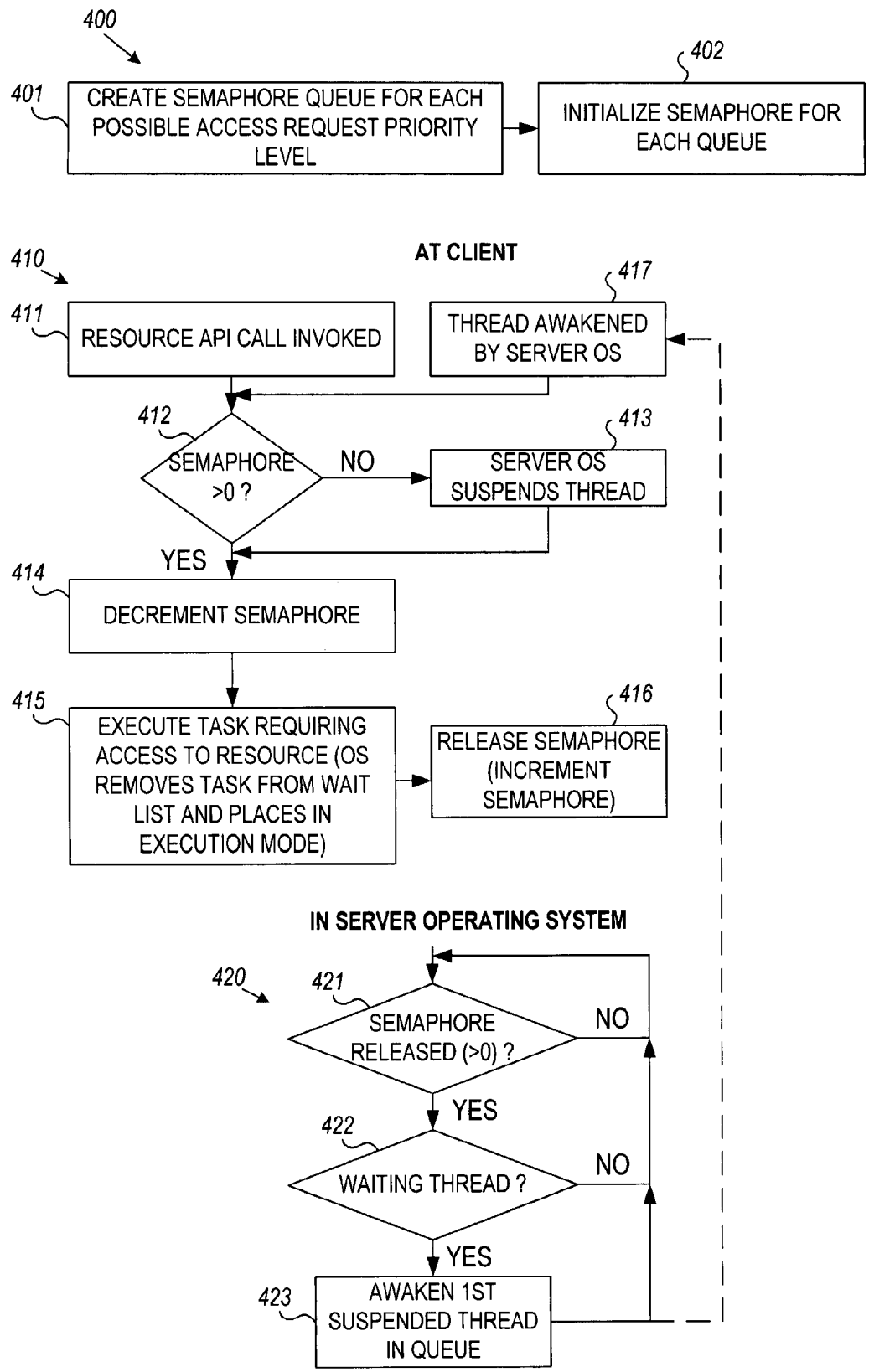
FIG. 4 is a flow diagram illustrating an exemplary method implementing a resource access management function.

FIG. 4 is a flow diagram illustrating an exemplary method implementing a resource access management function. The method includes a process 400 executing on a server which serves at least one exclusive- or limited-access resource. The resource is served by the server. The server may be integral to the resource or may execute on a computer remote to the resource. Process 400 creates a semaphore for each potential access request priority level in the system (i.e., one semaphore for each priority level) (step 401) and the value of each semaphore is initialized to a number, n, of access requests that may be granted access to either the next higher level queue, or, in the case of the highest level queue, the resources itself. The number, n, may be different for each semaphore, and depends on the queuing hierarchy and run rules of the resource access management function that it implements.

The method also includes a process 410 which executes on behalf of a client that wishes to access a resource. The client may be remote from the system, or may be another process executing within the same system as the server and/or resource. The client process 410 begins by invoking the application programming interface (API) of the resource (step 411). For example, in one embodiment the system is Automated Test Equipment (ATE) which provides an API method for accessing a particular resource in the ATE. When invoked, the API starts up a thread, which first determines whether the semaphore is available (i.e., is >0) or unavailable (i.e., semaphore value is 0) (step 412). If the semaphore is unavailable, the server operating system (OS) suspends the thread (step 413) and waits to be awakened by the server OS. When an API is suspended by the server OS, it is automatically added to a queue (or execution stack) by the OS. The details of the execution queue are implemented at the operating system level and essentially "invisible" to the higher level application invoking the API and to the API itself. However, generally speaking, the execution queue is a first-in-first-out queue.

If the semaphore is available, the API thread decrements the semaphore 414 and the API thread is placed in execution mode (step 415). In this regard, control of the resource may be transferred to the client that invoked the API thread. When execution of the task on the resource is complete, the API thread releases the semaphore (for example, by incrementing the semaphore value), and control is transferred from the client back to the server OS (step 416).

The server OS executes a process 420 which monitors the state of the semaphore. Whenever the semaphore becomes available by being released by a client (e.g., the value of the semaphore becomes greater than 0) (step 421), the server OS determines whether there are any API threads awaiting access to the resource (step 422). If there are tasks (API threads) waiting in the semaphore queue, the server OS awakens the first waiting thread in the queue (step 423).

When an API thread is awakened, the server OS places the API thread in an execution mode (step 417) and execution continues at the client (at step 412).

Figure 5:
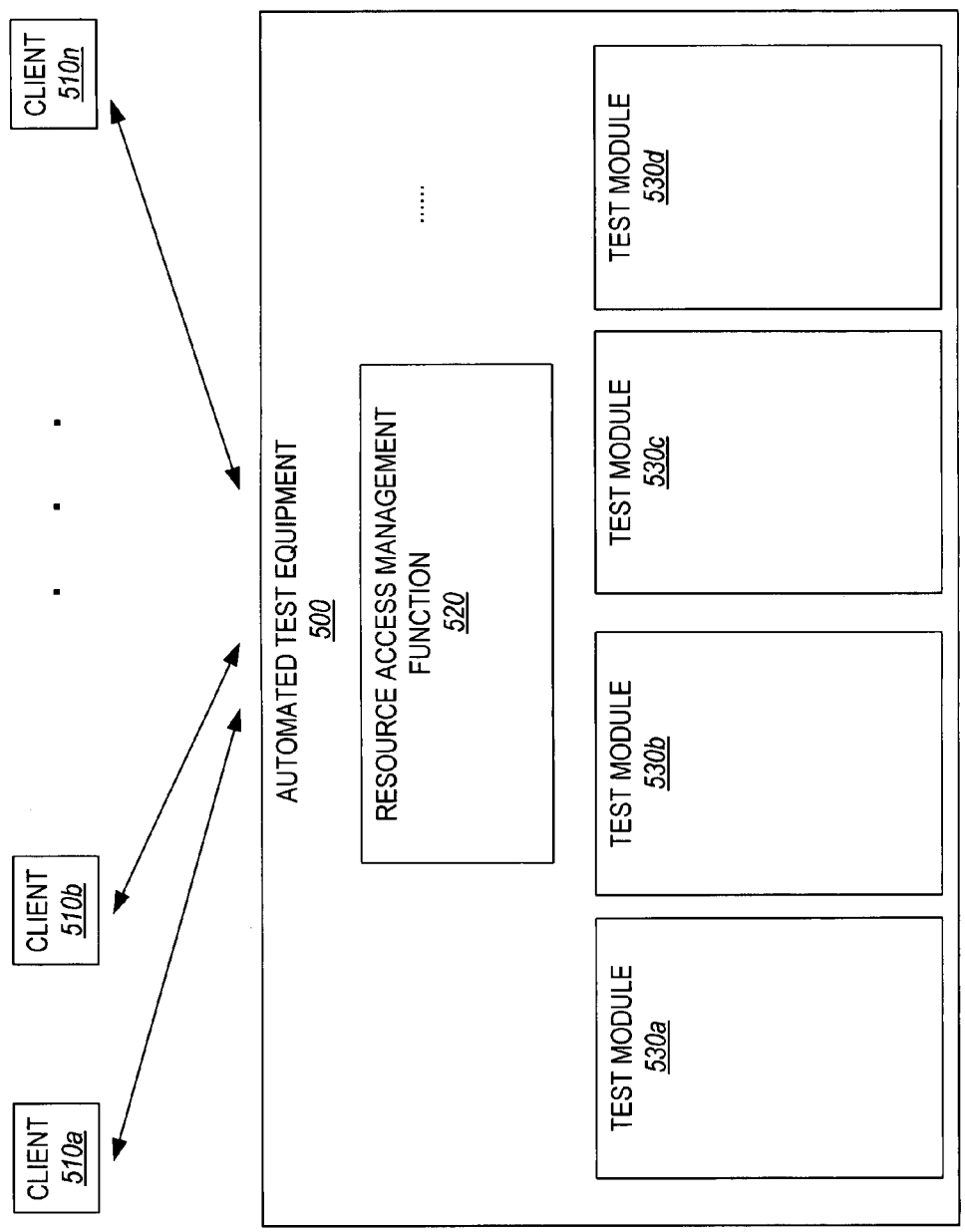
FIG. 5 is a block diagram of an embodiment of an automated test equipment (ATE) system that includes multiple limited-access resources.
Figure 6:
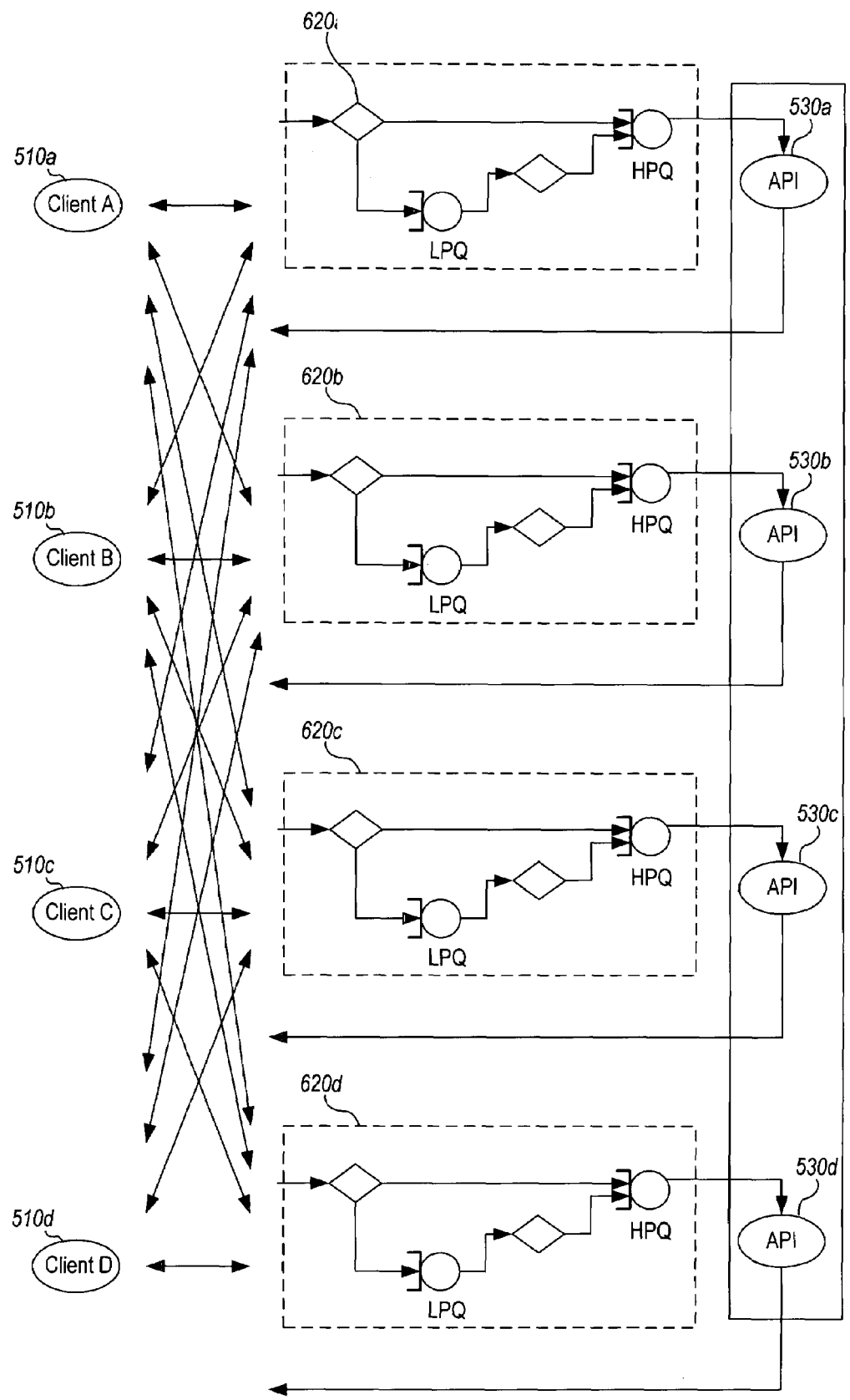
FIG. 6 is a block diagram of a model of the resource access management function of the ATE of FIG. 5.

Embodiments of the invention may be implemented in an Automated Test Equipment (ATE) system 500, as shown in FIG. 5. The ATE 500 includes a number of limited-access resources 530 (shown as 530a, 530b, 530c, 530d), whose access by clients 510 (shown as 510a, 510b, 510n) is controlled by a resource access management function 520. FIG. 6 illustrates a model of the resource access management function 520 of the ATE 500. In this model, the resource access management function 520 implements a separate queuing hierarchy 620a, 620b, 620c, 620d for each resource 530a, 530b, 530c, 530d. Each queuing hierarchy 620a, 620b, 620c, 620d is implemented according to the structure of the resource access management function 300 of FIG. 3.

Figure 7:
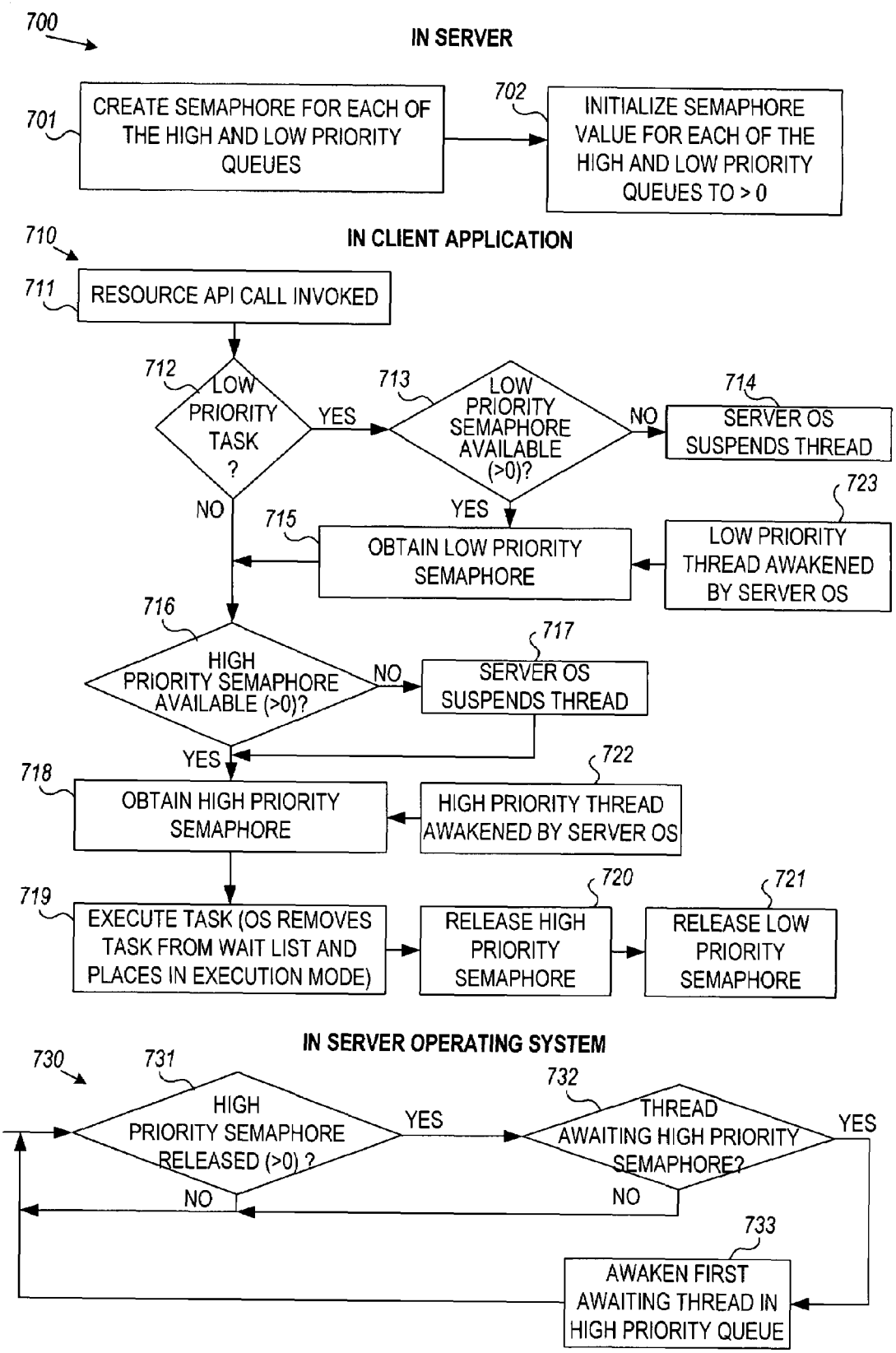
FIG. 7 is a flowchart illustrating an exemplary embodiment of a method followed by each of the queuing hierarchies of FIG. 6.

FIG. 7 illustrates a method followed by each of the queuing hierarchies 620a, 620b, 620c, 620d, and Appendix A illustrates a C++ programming language embodiment of computer programming code which implements the method of FIG. 7 utilizing semaphore operating system commands under the Linux or Unix operating system.

The method includes a process 700 executed by a server allowing access to the limited-access resources 530a, 530b, 530c, 530d. Process 600 creates both high and low priority semaphore queues for each resource managed by the server (step 601). The process 600 initializes the semaphore values of the high and low priority semaphore queues of each resource (step 602). For example, an exclusive-access resource may be initialized with a semaphore value of 1. A limited-access resource that allows access by only up to N clients may be initialized with a semaphore value of N. In one embodiment, the system generates an array of semaphores for each resource. Each semaphore array includes a semaphore designated as high priority, and a semaphore designated as low priority. In the embodiment shown in Appendix A, the createQueueSemaphore( ) function in the semaphore.cpp file, creates a semaphore semid_ds structure (Unix or Linux operating system) for each resource 530a, 530b, 530c, 530d to be managed by the resource access management function 520. The semid_ds structure comprises two semaphores which implement a high priority queue and a low priority queue.

A client process 710 of a client 510a, 510b, 510n may access one of the resources 530a, 530b, 530c, 530d by invoking the application programming interface (API) of the resource (step 711). The sendToATE( ) method in the in the api.cpp file shown in Appendix A is such an API. SendToATE( ) takes parameters including a resource identifier to identify which resource 530a, 530b, 530c, 530d the client requires access to, the priority level of the access request, and a data structure and corresponding size of the data structure in which the substance of the access request may be determined. When invoked, the sendToATE( ) method starts up a thread, which first determines whether the requested task is a low priority task or a high priority task (step 712).

If the requested task is low priority, the sendToATE( ) method determines whether the low priority semaphore is available (i.e., is >0) or unavailable (i.e., semaphore value is 0) (step 713). If the low priority semaphore is unavailable, the server operating system (OS) suspends the sendToATE( ) method (step 714) and waits to be awakened (step 723) by the server OS. If the low priority semaphore is available, the sendToATE( ) method obtains the semaphore (step 715) and the task is upgraded to high priority.

When a task is upgraded from low priority to high priority by receiving the low priority semaphore (step 715), or when a task is determined to be high priority at time of invocation (step 712), the method then determines whether the high priority semaphore is available (i.e., is >0) or unavailable (i.e., high priority semaphore value is 0) (step 716). If the high priority semaphore is unavailable, the server operating system (OS) suspends the sendToATE( ) method thread (step 717) and waits to be awakened by the server OS. If the high priority semaphore is available, the sendToATE( ) method decrements the high priority semaphore (step 718) and the task requested by the sendToATE( ) method is placed in execution mode (step 719). In this regard, control of the resource may be transferred to the client that invoked the sendToATE( ) method, as illustrated by the tsimtask( ) method in the tsim.cpp file of Appendix A. The tsimTask( ) method in the illustrative embodiment is merely a simulation, or "dummy" function, but in an actual embodiment, this method would be replaced by code for executing the actual requested task in the identified resource 530a, 530b, 530c, 530d, of the ATE 500. When execution of the task on the resource is complete, the sendToATE( ) method releases the high priority semaphore and the low priority semaphore (for example, by incrementing the values of the high priority semaphore and low priority semaphore, respectively) (steps 720 and 721), and control is transferred from the client back to the server OS.

The queueUp function of the semaphore.cpp file in Appendix A implements the addition of a sendToATE( ) method thread to an appropriate high or low priority queue (steps 712 through 717).

The server OS executes a process 730 which monitors the state of the high priority semaphore. Whenever the high priority semaphore becomes available by being released by a client (e.g., the value of the semaphore becomes greater than 0) (step 731), the server OS determines whether there are any sendToATE( ) method threads awaiting access to the resource (step 732). If one or more sendToATE( ) method threads have been suspended by the server OS and are waiting for control of the resource in line in the high priority queue, the server OS awakens the first waiting sendToATE( ) method thread in the high priority queue (step 733).

When an sendToATE( ) method thread waiting in the high priority queue is awakened (step 722), the server OS places the awakened sendToATE( ) method thread in a run mode. A sendToATE( ) method thread is awakened only if the high priority semaphore is available and the OS determines that control of the resource is to be transferred to the client that invoked the awakened API thread. When this happens (step 722), the sendToATE( ) method thread decrements the high priority semaphore (step 718) and the task requested by the sendToATE( ) method thread is placed in execution mode (step 719). When execution of the task on the resource is complete, the sendToATE( ) method thread releases the high priority and low priority semaphores (steps 720 and 721), and control is transferred from the client back to the server OS.

In the embodiment of Appendix A, steps 720, 721, and 731 through 733 are performed by the freeUpQ( ) function in the semaphore.cpp file.

In summary, embodiments of the present invention implement a queuing hierarchy using operating system semaphores to control access to limited-access resources with very little system overhead. Those of skill in the art will appreciate that the invented method and apparatus described and illustrated herein may be implemented in software, firmware or hardware, or any suitable combination thereof. Thus, those of skill in the art will appreciate that the method and apparatus of the invention may be implemented by a computer or microprocessor process in which instructions are executed, the instructions being stored for execution on a computer-readable medium and being executed by any suitable instruction processor. Preferably, the method and apparatus are implemented in software, utilizing the semaphore system calls under the Linux or Unix operating system to allow for highest speed and lowest system time overhead in managing the access to the resources. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. For example, it should be understood that although embodiments illustrated an ATE system, embodiments of the resource access management techniques described herein may be implemented in any system having one or more resources that require access by multiple clients.

APPENDIX A

```
ate.h
#define TRUE 1
#define FALSE 0
#define NUMBER_OF_RESOURCES 20
#define NUMBER_OF_PRIORITIES 2
#define CLIENT_KEY 8762
//Priorities
#define HIGH 0
#define LOW 1
int sendToATE(void *, int, int, int);
ate.cpp
#include <stdio.h>
#include <string.h>
#include <stdlib.h>
#include "ate.h"
int createQueueSemaphore( );
int removeQueueSemaphore( );
int attachATE( );
int freeUpQ(int, int);
int queueUp(int, int);
int main(int args, char *argv[ ])
{
    if (args == 1)
    {
        printf("Usage: ate [start/stop/kill]\n");
        exit(0);
    }
```

APPENDIX A-continued

```
    if (strcmp(argv[1], "start")==0)
    {
        printf("Starting\n");
        createQueueSemaphore( );
    }
    else
    if (strcmp(argv[1], "stop")==0)
    {
        printf("Stopping\n");
        attachATE( );
        for (int i=0; i< NUMBER_OF_RESOURCES; i++)
            queueUp(i,HIGH);
    }
    else
    if (strcmp(argv[1], "kill")==0)
    {
        createQueueSemaphore( );
        removeQueueSemaphore( );
        printf("ATE is detached\n");
    }
}
api.cpp
#include "ate.h"
int queueUp(int, int);
int freeUpQ(int, int);
int tsimTask(void *, int);
int sendToATE(void *dataPtr, int size, int priority, int resourceLink)
{
    queueUp(resourceLink, priority);
    tsimTask(dataPtr, size);
    freeUpQ(resourceLink, HIGH);
    if (priority==LOW) freeUpQ(resourceLink, LOW);
}
semaphore.cpp
#include <stdio.h>
#include <stdlib.h>
#include <sys/sem.h>
#include <sys/ipc.h>
#include <pthread.h>
#include <sched.h>
#include "ate.h"
union semun {
    int val;         /* value for SETVAL */
    struct semid_ds *buf;   /* buffer for IPC_STAT, IPC_SET */
    unsigned short *array;  /* array for GETALL, SETALL */
                /* Linux specific part: */
    struct seminfo *___buf; /* buffer for IPC_INFO */
} sem_union;
int queue_sem[NUMBER_OF_RESOURCES];  // last index is
client index, used for threads
int createQueueSemaphore( )
{
    sem_union.val=1;
    for (int i=0; i< NUMBER_OF_RESOURCES; i++)
    {
        queue_sem[i]=semget((key_t) CLIENT_KEY + i,
NUMBER_OF_PRIORITIES, 0666 | IPC_CREAT);
        semctl(queue_sem[i], LOW, SETVAL, sem_union);
        semctl(queue_sem[i], HIGH, SETVAL, sem_union);
    }
}
int removeQueueSemaphore( )
{
    for (int i=0; i<NUMBER_OF_RESOURCES; i++)
        if (semctl(queue_sem[i], 0, IPC_RMID, sem_union) == -1)
            printf("Error removing semaphore %d\n", queue_sem[i]);
}
int attachATE( )
{
    for (int i=0; i< NUMBER_OF_RESOURCES; i++)
    {
        queue_sem[i]=semget((key_t) CLIENT_KEY+i,
NUMBER_OF_PRIORITIES, 0666);
        if (queue_sem[i] == -1) {printf("ATE not present\n"); exit(0);}
    }
}
int attachResource(int resource) // used by threads
{
    return(semget((key_t) CLIENT_KEY + resource,
```

APPENDIX A-continued

```
NUMBER_OF_PRIORITIES, 0666));
    }
    int log(char *msg)
    {
        static FILE *log=NULL;
        if (log == NULL)
        {
            log=fopen("ATEGATE.LOG","w");
        }
        if (log != NULL) {fprintf(log,"%s", msg); fflush(log);}
    }
    void err(int n)
    {
        char buffy[100];
        sprintf(buffy,"Error from random module, %d\n", n);
        log(buffy);
    }
    void warn(int n)
    {
        char buffy[100];
        sprintf(buffy,"Warning from random module, %d\n", n);
        log(buffy);
    }
    int freeUpQ(int resourceLink, int priority)   // Give client control
through its semaphore
    {
        struct sembuf sem_b;
        sem_b.sem_op=1;
        sem_b.sem_num= priority;
        sem_b.sem_flg=0;
        if (semop(resourceLink, &sem_b, 1) == -1) log("wake failed\n");
    }
    int queueUp(int resourceLink, int priority)
    {
        struct sembuf sem_b;
        sem_b.sem_op=-1;
        sem_b.sem_flg=0;
        switch (priority)
        {
            case HIGH:
                //printf("Wait for high q only\n");
                sem_b.sem_num= HIGH;
                semop(resourceLink, &sem_b, 1);
                break;
            case LOW:
                //printf("Wait for low queue\n");
                sem_b.sem_num= LOW;
                semop(resourceLink, &sem_b, 1);   // wait for low priority q
first
                sem_b.sem_num= HIGH;
                //printf("Wait for high queue\n");
                semop(resourceLink, &sem_b, 1);   // wait for high priority q
                break;
            default:
                printf("Bad priority in QueueUp %d\n", priority);
                break;
        }
    }
tsim.cpp
#include <stdio.h>
int tsimTask( void *dataPtr, int size)
{
        // dummy routine to perform ATE access.
}
```

What is claimed is:

1. A method for controlling access to a limited-access resource, comprising:
   creating a plurality of semaphores associated with the resource, each semaphore corresponding to a different access request priority level, the plurality of semaphores comprising i) a high priority semaphore that, alone, controls access to the resource, and ii) at least one lower priority semaphore that only gates low priority access requests into the high priority semaphore;
   receiving an access request for access to the resource from a client process;
   determining a priority level associated with the access request;
   if the semaphore corresponding to the priority level associated with the access request is available, allowing the access request to obtain the semaphore corresponding to the priority level associated with the access request;
   if the semaphore corresponding to the priority level associated with the access request is not available, suspending the access request;
   monitoring availability of each of the plurality of semaphores;
   when any of the plurality of semaphores becomes available, allowing a suspended access request waiting for the available semaphore to obtain the available semaphore.

2. The method of claim 1, wherein suspended access requests waiting for a given semaphore obtain the semaphore in order of access request time.

3. The method of claim 1, wherein an access request that obtains a semaphore associated with a lower priority level then seeks to obtain the semaphore associated with a higher priority level.

4. A computer readable storage medium tangibly embodying program instructions which, when executed by a computer, implement a method for controlling access to a limited-access resource comprising:
   creating a plurality of semaphores associated with the resource, each semaphore corresponding to a different access request priority level, the plurality of semaphores comprising i) a high priority semaphore that, alone, controls access to the resource, and ii) at least one lower priority semaphore that only gates low priority access requests into the high priority semaphore;
   receiving an access request for access to the resource from a client process;
   determining a priority level associated with the access request;
   if the semaphore corresponding to the priority level associated with the access request is available, allowing the access request to obtain the semaphore corresponding to the priority level associated with the access request;
   if the semaphore corresponding to the priority level associated with the access request is not available, suspending the access request;
   monitoring availability of each of the plurality of semaphores;
   when any of the plurality of semaphores becomes available, allowing a suspended access request waiting for the available semaphore to obtain the available semaphore.

5. The computer readable storage medium of claim 4, wherein suspended access requests waiting for a given semaphore obtain the semaphore in order of access request time.

6. The computer readable storage medium of claim 4, wherein an access request that obtains a semaphore associated with a lower priority level then seeks to obtain the semaphore associated with a higher priority level.

7. A system comprising:
   a limited-access resource;
   a resource access management function which creates a plurality of semaphores associated with the resource, each semaphore corresponding to a different access request priority level, the plurality of semaphores comprising i) a high priority semaphore that, alone, controls access to the resource, and ii) at least one lower priority semaphore that only gates low priority access requests into the high priority semaphore, wherein the resource access management function receives an access request for access to the resource, determines a priority level associated with the access request, and if the semaphore corresponding to the priority level associated with the access request is available, allows the access request to obtain the semaphore corresponding to the priority level associated with the access request, and if the semaphore corresponding to the priority level associated with the access request is not available, suspends the access request, and wherein the resource access management function monitors availability of each of the plurality of semaphores and when any of the plurality of semaphores becomes available, allows a suspended access request waiting for the available semaphore to obtain the available semaphore.

8. The system of claim 7, wherein the resource access management function is a server process running over an operating system of the server, the operating system managing control of the semaphores.

9. The system of claim 8, wherein the operating system is a Linux operating system.

10. The system of claim 8, wherein the operating system is a Unix operating system.

11. The system of claim 7, wherein suspended access requests waiting for a given semaphore obtain the semaphore in order of access request time.

12. The system of claim 7, wherein an access request that obtains a semaphore associated with a lower priority level then seeks to obtain the semaphore associated with a higher priority level.

* * * * *